United States Patent [19]

Zitting

[11] 4,143,586

[45] Mar. 13, 1979

[54] MUD PUMP PISTON

[75] Inventor: Gordon T. Zitting, Sandy, Utah

[73] Assignee: Poly-Seal, Salt Lake City, Utah

[21] Appl. No.: 810,350

[22] Filed: May 16, 1977

Related U.S. Application Data

[63] Continuation of Ser. No. 626,671, Oct. 28, 1975, abandoned.

[51] Int. Cl.² .............................. F16J 1/06; F16J 9/00
[52] U.S. Cl. ....................................... 92/206; 92/207; 92/240; 92/250; 277/188 A
[58] Field of Search .................. 92/240, 250, 251, 206, 92/203, 207, 248, 249, 244; 277/188 R, 188 A

[56] References Cited

U.S. PATENT DOCUMENTS

| | | | |
|---|---|---|---|
| 1,977,075 | 10/1934 | Magnuson | 92/240 |
| 2,284,340 | 5/1942 | Nuckles | 92/244 X |
| 3,394,939 | 7/1968 | Mastro | 277/188 R |
| 3,448,665 | 6/1969 | Allinquant | 92/240 X |
| 3,603,215 | 9/1971 | Leschisin | 92/240 X |
| 3,810,639 | 5/1974 | Scannell | 277/188 R |

FOREIGN PATENT DOCUMENTS

| | | | |
|---|---|---|---|
| 1263810 | 5/1961 | France | 92/240 |
| 464336 | 4/1950 | Italy | 277/165 |
| 804778 | 11/1958 | United Kingdom | 92/244 X |

Primary Examiner—Irwin C. Cohen
Attorney, Agent, or Firm—Lynn G. Foster

[57] ABSTRACT

A mud pump piston comprising an annular elastomeric ring having an annular circumferential surface defining an acute angle circumferential tip of relatively small area which engages the pump cylinder wall and an annular anti-extrusion ring connected to and displaceable with the elastomeric ring, the elastomeric ring being configurated to correspond with and rest against a dish shaped surface of the anti-extrusion ring presenting a bevelled or diagonal slope extending from the outside diameter (acute to the axis of the mud pump piston) spanning substantially more than half of the radial distance occupied by the annular elastomeric ring and the annular anti-extrusion ring, which diagonal surface merges with a flat surface normal to the axis of the mud pump piston whereby hydro-planing is reduced because of the increased unit pressure load on the small tip area, along a line contact, the tip is automatically wear compensating, friction is substantially reduced by reason of the smaller high pressure wipe area, longer piston life is attained with improved wear characteristics and less maintenance.

3 Claims, 3 Drawing Figures

MUD PUMP PISTON

CONTINUITY

This is a continuation of my copending U.S. Pat. application Ser. No. 626,671, filed Oct. 28, 1975, now abandoned.

BACKGROUND

1. Field of Invention

The present invention relates generally to a mud pump piston and more particularly to a multi-component mud pump piston providing improved sealing, wear, and efficiency characteristics resulting in a longer useful life.

2. Prior Art

In the past, mud pump pistons have comprised a relatively yieldable rubber ring supported by a rigid backing ring which, by reason of the stresses imposed upon the mud pump piston frequently cause failure of the bond existing between the elastomeric rubber ring and the backing ring. In addition, prior art proposals have experienced relatively short useful life, have not provided adequately for maintaining an effective seal notwithstanding wear imposed upon the rubber ring and have frequently allowed displacement of deleterious material across the seal due to relatively low pressures exerted by the rubber ring upon the cylinder wall.

BRIEF SUMMARY AND OBJECTS OF THE PRESENT INVENTION

The present invention comprises a mud pump piston having an elastomeric ring superimposed upon an anti-extrusion ring, the elastomeric ring being formed of a yieldable wear resistant elastomer and the anti-extrusion ring preferably being formed of ultra-high molecular weight synthetic resin which is rigid but which exhibits cold flow creep with wear under axial pressure thereby compensating for such wear. A novel interface exists between the elastomeric ring and the anti-extrusion ring which comprises a dish shaped surface which merges inwardly with a flat surface normal to the axis of the mud pump piston. The elastomeric ring comprises an annular circumferential surface presenting an acute angle circumferential tip of relatively small area which engages and wipes the pump cylinder wall such that the elastomeric ring automatically compensates for wear over a protracted period of time, the useful life of the seal is greatly increased, a significantly higher unit pressure loading on said small tip line of contact or area is accomplished which not only adds to the useful life of the piston but significantly resists any displacement of foreign material across the seal with hydro-planing being greatly reduced because of the mentioned higher pressure per square inch existing on the small tip line area.

With the foregoing in mind, it is a primary object of the present invention to provide a novel mud pump piston.

A further significant object of the present invention is the provision of a unique mud pump piston comprising elastomeric ring and an anti-extrusion ring at the interface between the two being novelly configurated to materially alleviate forces tending to cause failure of the bond between the two rings.

A further paramount object of the present invention is the provision of a mud pump piston comprising an elastomeric ring and an anti-extrusion ring wherein the elastomeric ring presents a novel tip configuration which creates a line area contact thereby significantly improving the operation, wear characteristics and useful life of the piston.

Other objects, features and advantages of the present invention will become more fully apparent in light of the following detailed description of a preferred embodiment thereof as illustrated in the accompanying drawings.

DETAILED DESCRIPTION OF ILLUSTRATED EMBODIMENT

Figure 1:
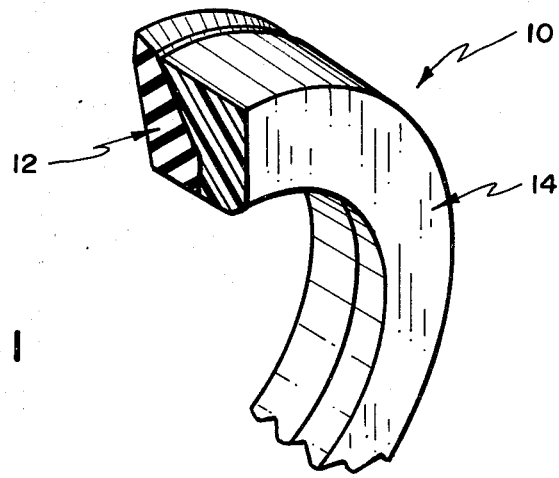
FIG. 1 is a partial broken away perspective representation of a mud pump piston in accordance with the present invention.

Reference is now made to the drawings wherein like numerals are used to designate like parts throughout, the drawings generally illustrating a presently preferred mud pump piston embodiment 10 in accordance with the present invention. The multi-component piston 10 comprises an elastomeric ring 12 of comparatively soft yieldable material such as rubber (buna N, butyl compound or the like), soft urethane or soft neoprene, and an anti-extrusion ring 14 formed of a synthetic resinous material comprising ultra-high molecular weight polyethylene or equivalent which exhibits a cold flow creep to automatically compensate for wear when placed under pressure in the installed condition as shown best in FIG. 3.

The elastomeric ring 12 is annular in its configuration with the cross-sectional body 16 thereof shaped so as to coverge outwardly to a projecting tip 18. The interior at wall 20 forms a hollow annular opening which merges with an outwardly and upwardly directed flat bevelled surface 22 and a lower (as shown in the drawings) flat surface 24 which is normal to the axis of the piston. The normal surface 24 merges with a bevelled surface 26 which is also directed upwardly and outwardly (as viewed in FIG. 2) so as to progressively converge toward top bevelled surface 22. The surface 22 in turn merges with a very narrow annular surface 28 normal to the piston axis which comprises the top surface of the elastomeric seal 12. Surface 28 merges with a downwardly and inwardly extending surface 30 the surface dimension of which is illustrated as being approximately three times the diametral width of surface 28 and which forms an acute angle less than 90° with the surface 28. This angle is designated as alpha ($\alpha$). Thus, the tip 18 is comprised of that material situated between the surfaces 28 and 30, the maximum radial dimension from the piston axis to the tip 18 being greater than any other radial distance spanned by any other part of the two component seal 10. The specific purposes of the tip 18 will be hereinafter more fully explained.

The rigid anti-extrusion ring 14 has a hollow annular interior defined by a wall surface 40 which terminates downwardly in a rounded corner 42, the diamter of the opening formed by surface 40 being equal to the diameter formed by surface 20 of the elastomeric ring 12. The upper part of the anti-extrusion ring 40 comprises an interior surface 44 which is normal to the axis of the piston 10 and precisely matches and mates with the surface 24 of the elastomeric ring 12, surface 44 merging with diagonal or bevelled surface 46 which corresponds with and matches previously described surface 26 of the elastomeric seal 12. Anti-extrusion ring surface 46 merges with a top annular surface 44 which is relatively narrow and thereby defines a space between the anti-extrusion ring 14 and the elastomeric ring 12 accommodating compression of the tip 18 of the elastomeric seal 12 during use.

Figure 2:
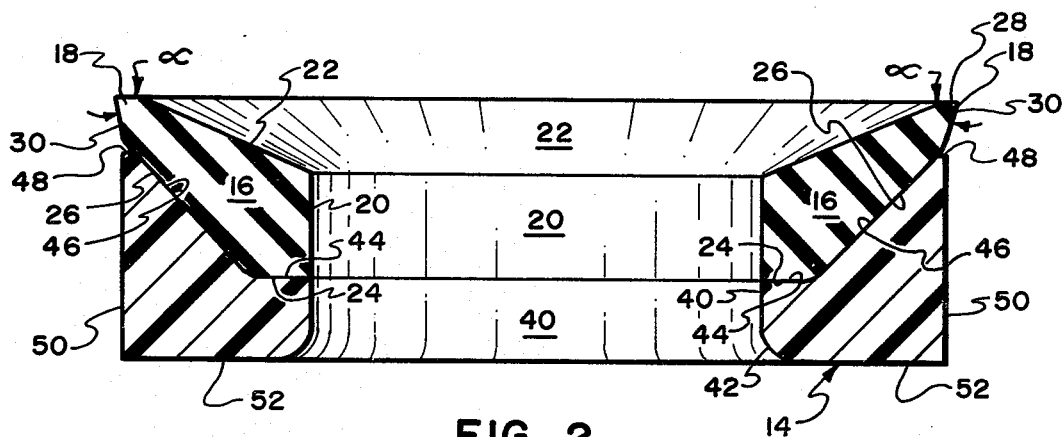
FIG. 2 is a cross-sectional view of the mud pump piston of FIG. 1.

The anti-extrusion ring also comprises a circumferential wear surface 50 the diameter of which is somewhat less than the diameter of the tip of the elastomeric ring 12, as can be readily determined by examination of FIG. 2. Circumferential surface 50 merges with anti-extrusion ring surface 52, which is smooth and disposed normal to the axis of the piston 10.

Figure 3:
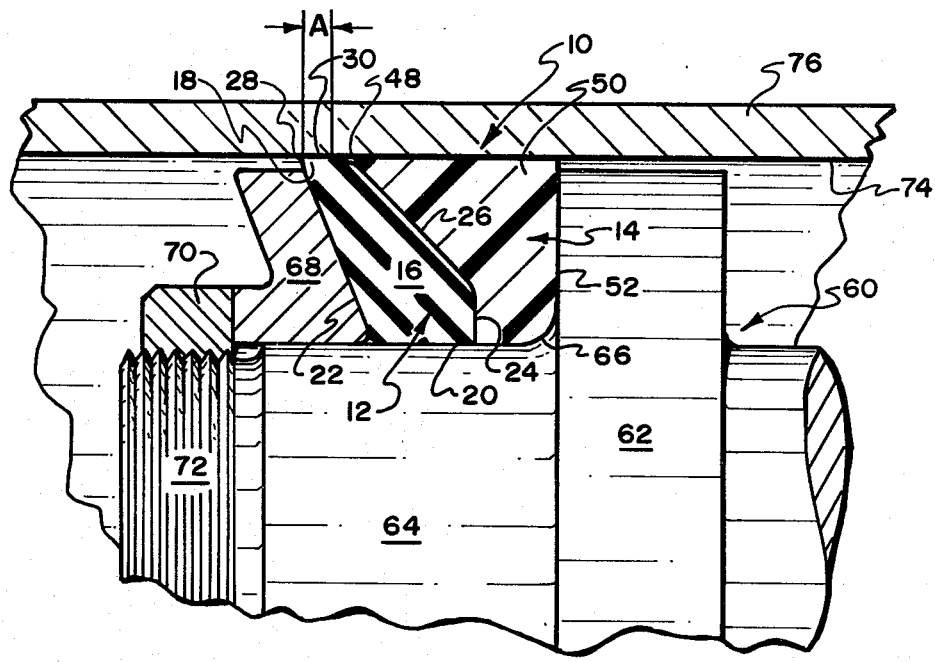
FIG. 3 is a cross-sectional view of the mud pump piston of FIG. 1 in its installed position.

With reference to FIG. 3, it is to be appreciated that the piston 10 is mounted physically upon a piston rod 60 comprising part of the mud pump, the piston rod comprising an annular enlarged flange 62 and a cylindrical body 64, each sized and shaped to respectively tightly and contiguously engage the surface 52 the anti-extrusion ring 14 and the surfaces 20 and 40 of the elastomeric ring 12 and the anti-extrusion ring 14, with the rounded corner 42 of the anti-extrusion ring 14 firmly disposed in the fillet 66 existing between the flange 62 and the cylindrical portion 64. This posture is maintained by a flanged retainer 68 sized and shaped to uniformly engage and apply pressure to the bevelled surface 22 of the elastomeric ring 12 as illustrated in FIG. 3, the flanged retainer 68 being held in the illustrated position by a lock nut 70 secured to the distal threaded end 72 of the cylindrical part 64.

In the illustrated position, only limited pressure exists between the circumferential surface 50 of the anti-extrusion ring 14 and the interior surface 74 of the cylinder wall 76 of the mud pump, the primary sealing pressure being created along a line area "A" which comprises an extremely small area along surface 30 at the tip 18 of the elastomeric ring 12, caused to be compressed and constricted at said site. The acute angle circumferential tip 18 which engages the pump cylinder wall provides an improved seal which results in a significantly greater useful life with far greater unit pressures being exerted at said small tip area which greatly reduces the likelihood of foreign matter passing across the seal and also provides an automatic wear take up or compensation feature such that mud pump piston is efficient for a longer interval of time, the total amount of frictional wear being reduced by the described configuration. Hydro-planing is greatly reduced also because of the higher unit pressures exerted at seal site "A". The dish shaped interrelationship or interface between the rings accommodates wear take up of the anti-extrusion ring 14 due to cold flow creep of the material thereof when situated in the compacted or compressed state illustrated in FIG. 3 between the flange 62 and the lock nut 70.

The invention may be embodied in other specific forms with departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A mud pump piston seal assembly comprising:
    a yieldable elastomeric annular ring adapted to be mounted upon a piston rod of a mud pump, the elastomeric ring comprising a central aperture face having a substantial axial length, a non-bifurcated solid wedge-shaped body bounded by an annular radially extending base surface extending from said central aperture face, forward and trailing converging linear body surfaces each disposed at an acute angle to the radial direction, said forward body surface extending from said annular base surface and said trailing body surface extending from said central aperture face, which converging linear body surfaces respectively merge with more sharply outwardly divergent tapered linear tip surfaces which intersect with each other in an unstressed state at an angle less than 90 degrees to form a circumferential annular diagonally directed apex, the unstressed apex having a diameter greater than any other portion of the elastomeric annular ring, one of said tip surfaces being essentially radially directed, the length of either linear tip surface being substantially less than the axial length of the central aperture face of the elastomeric annular ring;
    an anti-extrusion ring of rigid synthetic resinous material having cold flow creep wear take-up characteristics adapted to contiguously frictionally engage the wall of a cylinder notwithstanding wear, the anit-extrusion ring further comprising an axial central aperture face having a predetermined axial length and adapted to be mounted upon a piston rod, a circumferential annular face having a maximum diameter less than the diameter of the tip of the elastomeric ring, the circumferential annular face having an axial length substantially greater than the predetermined axial length of the central aperture face of the anti-extrusion ring and substantially greater than the length of either of the two linear tip surfaces of the elastomeric annular ring, the anti-extrusion ring also comprising an annular surface matching contiguously with one of the two converging body surfaces and the base surface of the elastomeric ring whereby the elastomeric ring is contiguously cradled, exclusive of the tip, by the rigid anti-extrusion ring and the elastomeric annular ring and the anti-extrusion ring are unitarily displaced with a piston rod when mounted thereon in axially aligned relation.

2. A mud pump piston seal assembly according to claim 1 wherein the contiguous surfaces of the elastomeric and anti-extrusion rings comprise in each case two flat surfaces intersecting each other at an angle substantially greater than 90°, one said surface being radially normal to the axis of the piston and extending inwardly from said intersection to the central aperture and the other surface extending in a direction diagonal to said axis outwardly from said intersection, said other surface of the elastomeric ring extending to one of the tip surfaces.

3. A mud pump piston mechanism comprising:
    a cylinder;
    a piston comprising a piston rod and a radially projecting annular flange having a circumferential surface narrowly spaced from the interior of the cylinder and a removable retainer at the distal end thereof;

a yieldable elastomeric annular ring mounted adjacent the distal end of the piston rod, the elastomeric ring comprising a central aperture face having a substantial axial length, a non-bifurcated solid wedge-shaped body bounded by an annular radially extending base surface extending from said central aperture face, forward and trailing converging linear body surfaces each disposed at an acute angle to the radial direction, said forward body surface extending from said annular base surface and said trailing body surface extending from said central aperture face, which converging linear body surfaces respectively merge with more sharply outwardly divergent tapered linear tip surfaces which intersect with each other in an unstressed state at an angle less than 90 degrees to form a circumferential annular diagonally directed apex, the unstressed apex having a diameter greater than any other portion of the elastomeric annular ring, one of said tip surfaces being essentially radially directed, the length of either linear tip surface being substantially less than the axial length of the central aperture face of the elastomeric annular ring, only one of the linear tip surfaces being in wiping contact with the interior of the cylinder;

an anti-extrusion ring of rigid synthetic resinous material having cold flow creep wear take-up characteristics to contiguously frictionally engage the wall of the cylinder notwithstanding wear, the anti-extrusion ring further comprising an axial central aperture face having a predetermined axial length and mounted upon the piston rod, a circumferential annular face having a maximum diameter less than the diameter of the tip of the elastomeric ring, the circumferential annular face having an axial length substantially greater than the predetermined axial length of the central aperture face of the anti-extrusion ring and substantially greater than the length of either of the two linear tip surfaces of the elastomeric annular ring, the anti-extrusion ring also comprising an annular surface matching contiguously with one of the two converging body surfaces and the base surface of the elastomeric ring whereby the elastomeric ring is contiguously cradled, exclusive of the tip, by the rigid anti-extrusion ring and the elastomeric annular ring and the anti-extrusion ring are unitarily displaced with the piston rod, when unitarily displaced with the piston rod, the anti-extrusion ring providing a radially directed base surface matching and contiguous with the flange of the piston;

retaining means engaged by said retainer comprising a diagonal surface engaging essentially all of the trailing linear body surface of the elastomeric annular ring and having a diameter substantially less than the diameter of the apex and the diameter of the interior of the cylinder whereby the elastomeric ring and the anti-extrusion ring are compressively held between the retaining means and the flange at the distal end of the piston and move unitarily with the piston within the cylinder with only the apex of the elastomeric ring compressively wiping the cylinder interior wall surface and the circumferential face of the anti-extrusion ring contiguously engaging the cylinder interior wall to absorb wear.

* * * * *